US011082448B2

(12) United States Patent
Bagarolo et al.

(10) Patent No.: US 11,082,448 B2
(45) Date of Patent: Aug. 3, 2021

(54) PREVENTING PHISHING USING DNS

(71) Applicant: INTERNATIONAL BUSINESS MACHINES CORPORATION, Armonk, NY (US)

(72) Inventors: Antonio Bagarolo, Marcianise (IT); Paolo Ottaviano, Rome (IT); Gianluca Perreca, Rome (IT); Pasquale Maria Mascolo Montenero, Barletta (IT); Marco Imperia, Rome (IT); Maximiliano Cammisa, Rome (IT)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 293 days.

(21) Appl. No.: 16/008,665

(22) Filed: Jun. 14, 2018

(65) Prior Publication Data
US 2019/0387022 A1 Dec. 19, 2019

(51) Int. Cl.
*H04L 29/06* (2006.01)
*H04L 29/12* (2006.01)

(52) U.S. Cl.
CPC ...... *H04L 63/1483* (2013.01); *H04L 61/1511* (2013.01)

(58) Field of Classification Search
CPC .................. H04L 63/1483; H04L 61/1511
See application file for complete search history.

(56) References Cited

U.S. PATENT DOCUMENTS

| 8,291,065 | B2 | 10/2012 | Goodman et al. | |
| 8,990,933 | B1 * | 3/2015 | Magdalin | H04L 63/1483 709/229 |
| 9,521,165 | B2 | 12/2016 | Feng et al. | |
| 9,762,612 | B1 | 9/2017 | Schiffman | |
| 10,560,423 | B1 * | 2/2020 | Rodriguez | H04L 67/02 |
| 2009/0089426 | A1 * | 4/2009 | Yamasaki | H04L 63/0236 709/225 |
| 2009/0157889 | A1 | 6/2009 | Treuhaft | |
| 2012/0198043 | A1 * | 8/2012 | Hesketh | H04L 67/2842 709/223 |

(Continued)

FOREIGN PATENT DOCUMENTS

AU   2012352971 A1 * 1/2014 ....... G06F 16/24575

OTHER PUBLICATIONS

Huang et al., "Countermeasure Techniques for Deceptive Phishing Attack", 2009 International Conference on New Trends in Information and Service Science, Date of Conference: Jun. 30-Jul. 2 (Year: 2009).*

(Continued)

*Primary Examiner* — Morshed Mehedi
(74) *Attorney, Agent, or Firm* — Scott Dobson; Andrew D. Wright; Roberts Calderon Safran & Cole, P.C.

(57) ABSTRACT

Methods and systems for preventing phishing attacks using the domain name system are disclosed. A method includes: receiving, by a computing device, a domain name system (DNS) request comprising a domain name; determining, by the computing device, at least one domain name that is similar to the domain name; and sending, by the computing device, the at least one domain name that is similar to the domain name as a response to the DNS request.

20 Claims, 3 Drawing Sheets

(56) References Cited

U.S. PATENT DOCUMENTS

| | | | | |
|---|---|---|---|---|
| 2013/0117282 | A1* | 5/2013 | Mugali, Jr. | H04L 61/1511 |
| | | | | 707/748 |
| 2015/0106725 | A1* | 4/2015 | Kamdar | H04L 61/3025 |
| | | | | 715/739 |
| 2015/0207812 | A1* | 7/2015 | Back | H04L 63/1441 |
| | | | | 726/23 |
| 2015/0358285 | A1* | 12/2015 | Ellard | H04L 41/00 |
| | | | | 726/12 |
| 2016/0065597 | A1* | 3/2016 | Nguyen | H04L 63/1408 |
| | | | | 726/22 |
| 2016/0352772 | A1* | 12/2016 | O'Connor | H04L 63/1483 |
| 2017/0094022 | A1* | 3/2017 | Borkhanov | H04L 67/34 |
| 2017/0126730 | A1 | 5/2017 | Oberheide | |
| 2017/0237706 | A1* | 8/2017 | Wei | H04L 61/1511 |
| | | | | 370/392 |
| 2018/0048729 | A1* | 2/2018 | Duvdevani | H04L 67/2814 |
| 2018/0300475 | A1* | 10/2018 | Zhang | H04L 63/0281 |
| 2018/0351976 | A1* | 12/2018 | Shitrit-Efergan | |
| | | | | H04L 63/1458 |
| 2019/0394217 | A1* | 12/2019 | Chen | H04L 63/1458 |

OTHER PUBLICATIONS

Tan et al, "PhishWHO: Phishing webpage detection via identity keywords extraction and target domain name finder", https://www.sciencedirect.com/science/article/pii/S0167923616300781, Decision Support Systems, vol. 88, Aug. 2016, 1 page.

Ramesh et al. "An efficacious method for detecting phishing webpages through target domain identification", https://www.sciencedirect.com/science/article/pii/S0167923614000037, Decision Support Systems, vol. 61, May 2014, 11 pages.

* cited by examiner

PREVENTING PHISHING USING DNS

BACKGROUND

The present invention generally relates to computing devices and, more particularly, to methods and systems for preventing phishing attacks using the domain name system.

Phishing is the attempt to obtain sensitive information such as usernames, passwords, and credit card details (and, indirectly, money), often for malicious reasons, by disguising as a trustworthy entity in an electronic communication. Phishing is often engaged in by fraudulent websites that have domain names that are similar to a domain name of a well-known website. For example, a fraudulent website may have a domain name that is a misspelling of a well-known website's domain name.

Some antivirus software and web browsers include or use a database of known phishing websites. Users of a particular antivirus software or a particular web browser may be notified of and/or prevented from visiting known phishing websites. For example, if a user of a particular web browser misspells a well-known website's domain name, and the misspelled domain name belongs to a phishing website, the web browser may alert the user to the phishing website and/or prevent a webpage associated with the phishing website from loading.

SUMMARY

In a first aspect of the invention, there is a method that includes: receiving, by a computing device, a domain name system (DNS) request comprising a domain name; determining, by the computing device, at least one domain name that is similar to the domain name; and sending, by the computing device, the at least one domain name that is similar to the domain name as a response to the DNS request.

In another aspect of the invention, there is a computer program product that includes a computer readable storage medium having program instructions embodied therewith. The program instructions are executable by a computing device to cause the computing device to: receive information about domain names similar to a first domain name; store, in a domain name system (DNS) record for the first domain name, the received information about the domain names similar to the first domain name; receive a request comprising the first domain name; and send the information about the domain names similar to the first domain name as a response to the request.

In another aspect of the invention, there is a system that includes: a hardware processor, a computer readable memory, and a computer readable storage medium associated with a computing device; program instructions configured to send a domain name system (DNS) request comprising a domain name; program instructions configured to receive at least one domain name that is similar to the domain name as a response to the DNS request; and program instructions configured to determine that the domain name is associated with a fraudulent website using the received at least one domain name that is similar to the domain name, wherein the program instructions are stored on the computer readable storage medium for execution by the hardware processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
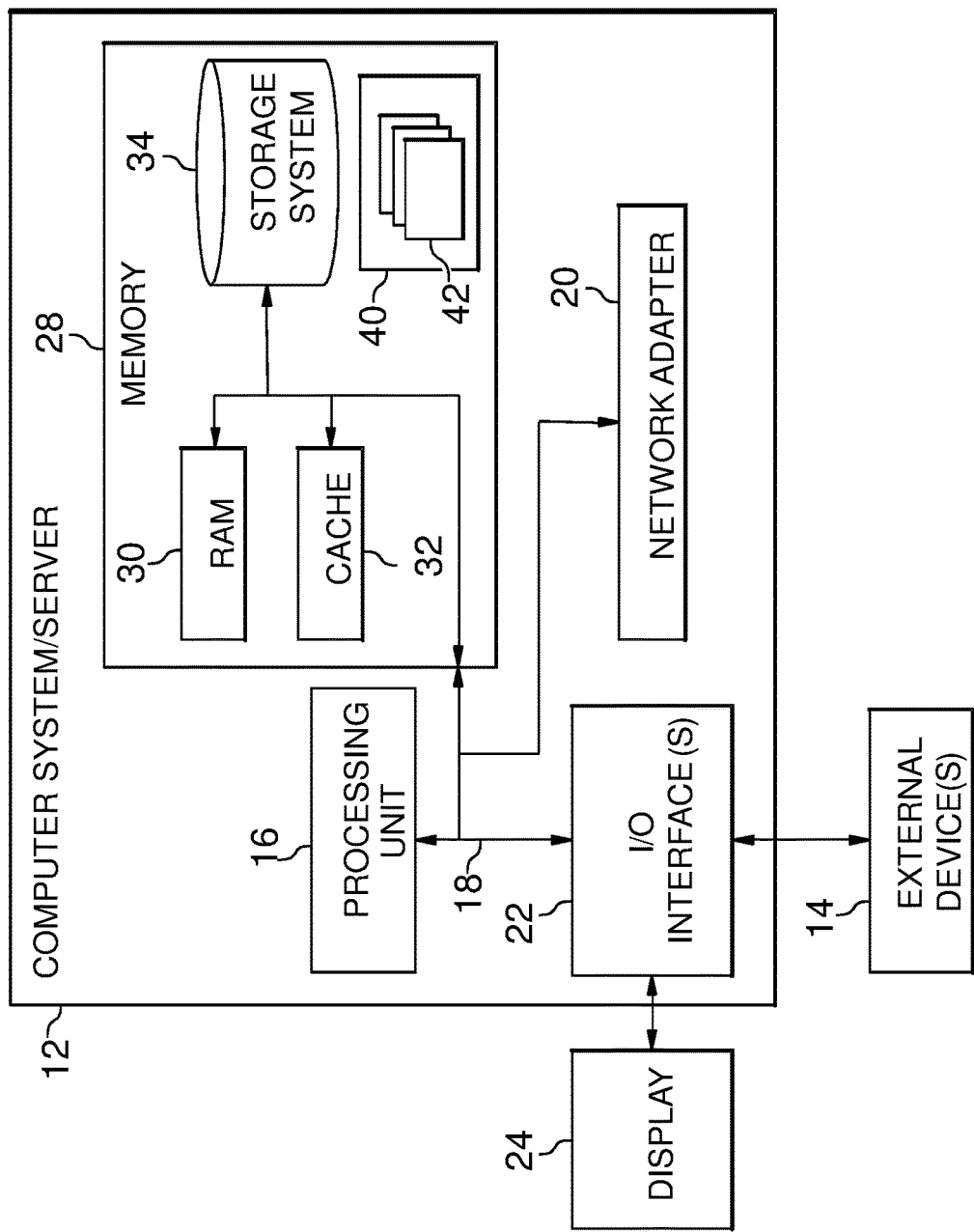
FIG. 1 depicts a computer system in accordance with aspects of the invention.

The present invention generally relates to computing devices and, more particularly, to methods and systems for preventing phishing attacks using the domain name system. As described herein, aspects of the invention include a method and system providing a distributed solution to the problem of phishing. In embodiments, in response to receiving a domain name system (DNS) resolution request for a hostname, a DNS server provides both an Internet Protocol (IP) address responsive to the DNS resolution request and a list of similar hostnames.

Conventional phishing attack prevention methods only work within the context of a particular antivirus software or a particular web browser. Accordingly, these conventional methods are ineffective for users that do not use the particular antivirus software or web browser. Also, in the conventional methods, different databases are used by each antivirus software product and web browser, and some databases may be more complete than others.

As described herein, aspects of the invention provide a distributed solution for preventing phishing attacks that utilizes a DNS distributed database and functions with any software used by a user (i.e., no particular web browser or antivirus software is required). Additionally, as described herein, aspects of the invention include a method and system that fills a TXT field in a DNS answer responsive to a DNS request with a list of similar hostnames and a similarity score for each hostname in the list. Other aspects of the invention include a method and system that receives the list of similar hostnames and the similar score for each hostname in the list, filters the list based upon one or more constraints (e.g., a similarity score that is higher than a predetermined threshold), and returns the filtered list to a client that made the DNS request.

Embodiments improve the functioning of a computer by providing for a distributed solution to prevent phishing attacks. In particular, embodiments improve DNS resolution functions by utilizing a DNS distributed database and functioning with any software used by a user to provide a filtered list of hostnames that are similar to the hostname that is the subject of a DNS resolution request. The filtered list of hostnames may include well-known domain names that may be an intended destination of a user who inadvertently specified a domain name associated with a fraudulent website. Furthermore, embodiments may alert a user of the other well-known domain names in the filtered list and/or prevent a web page associated with a specified domain name associated with a fraudulent website from being loaded. Additionally, the system uses techniques that are, by definition, rooted in computer technology (e.g., DNS resolution and DNS servers) that cannot be performed manually by a person.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
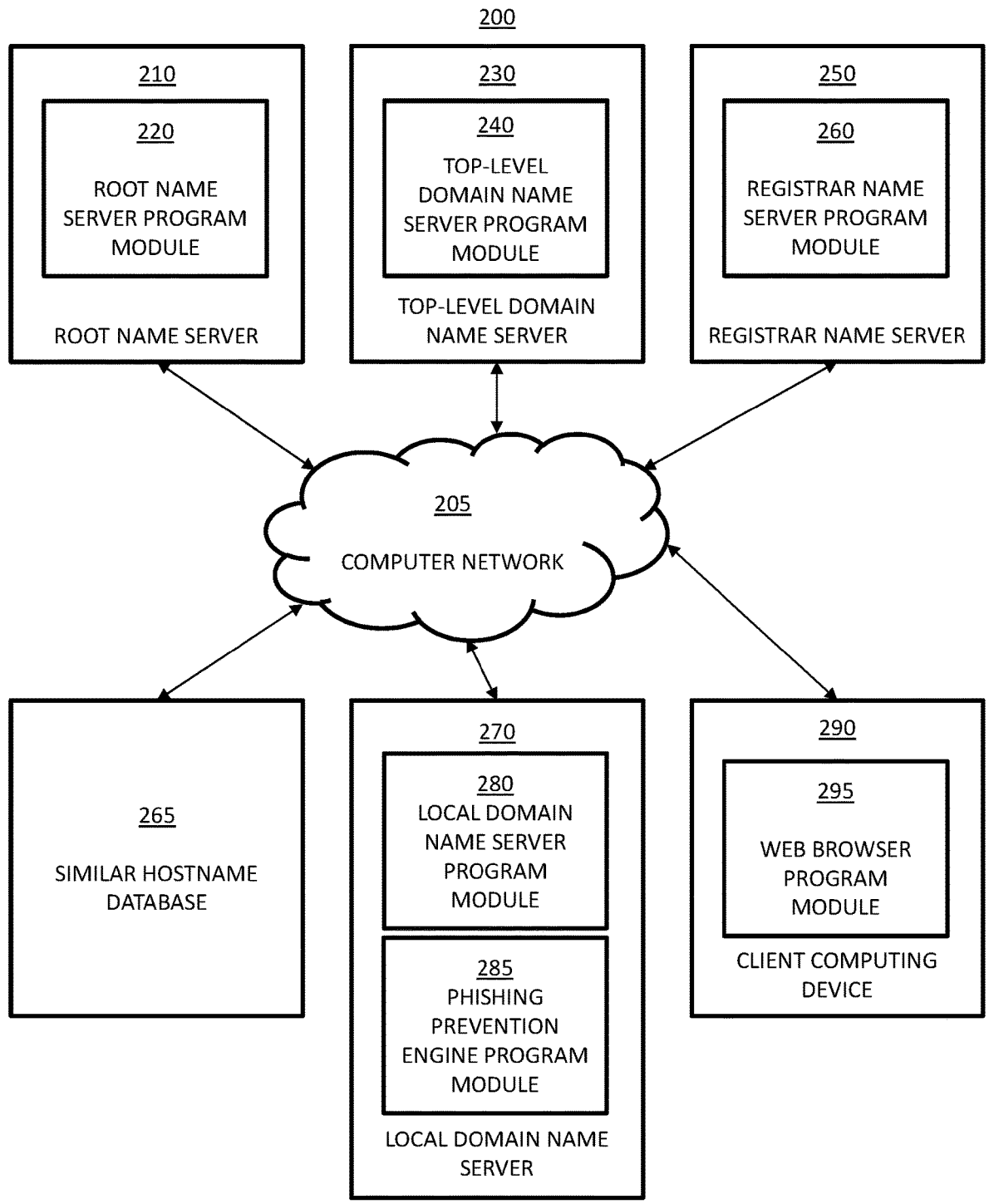
FIG. 2 depicts an illustrative environment in accordance with aspects of the invention.

FIG. 2 depicts an illustrative environment 200 in accordance with aspects of the invention. As shown, the environment 200 comprises a root name server 210, a top-level domain name server 230, a registrar name server 250, a similar hostname database 265, a local domain name server 270, and a client computing device 290 which are in communication with each other via a computer network 205. The computer network 205 may be any suitable network such as a LAN, WAN, or the Internet. The root name server 210, the top-level domain name server 230, the registrar name server 250, the similar hostname database 265, the local domain name server 270, and the client computing device 290 may be physically collocated, or may be situated in separate physical locations.

The quantity of devices and/or networks in the environment 200 is not limited to what is shown in FIG. 2. In practice, the environment 200 may include additional devices and/or networks; fewer devices and/or networks; different devices and/or networks; or differently arranged devices and/or networks than illustrated in FIG. 2. Also, in some implementations, one or more of the devices of the environment 200 may perform one or more functions described as being performed by another one or more of the devices of the environment 200.

In embodiments, the root name server 210 may be a computer server 12 as shown in FIG. 1. The root name server 210 may be implemented as hardware and/or software using components such as mainframes; RISC (Reduced Instruction Set Computer) architecture based servers; servers; blade servers; storage devices; networks and networking components; virtual servers; virtual storage; virtual networks, including virtual private networks; virtual applications and operating systems; and virtual clients.

In embodiments, the root name server 210 may be a name server for a root zone of the DNS and may include a root name server program module 220, which may include hardware and/or software and may be one or more of the program modules 42 shown in FIG. 1. According to an embodiment, the root name server program module 220 includes program instructions for performing functions associated with answering DNS resolution requests (e.g., from the local domain name server 270) for records in the root zone of the DNS, including returning one or more authoritative name servers (e.g., the top-level domain name server 230) for each of a plurality of top-level domains. The program instructions included in the root name server program module 220 of the root name server 210 may be executed by one or more hardware processors.

Sill referring to FIG. 2, in embodiments, the top-level domain name server 230 may be a computer server 12 as shown in FIG. 1. The top-level domain name server 230 may be implemented as hardware and/or software using components such as mainframes; RISC (Reduced Instruction Set Computer) architecture based servers; servers; blade servers; storage devices; networks and networking components; virtual servers; virtual storage; virtual networks, including virtual private networks; virtual applications and operating systems; and virtual clients.

In embodiments, the top-level domain name server 230 may be a name server for a particular top-level domain zone (e.g., .com, .net, .org, etc.) of the DNS and may include a top-level domain name server program module 240, which may include hardware and/or software and may be one or more of the program modules 42 shown in FIG. 1. According to an embodiment, the top-level domain name server program module 240 includes program instructions for performing functions associated with answering DNS resolution requests (e.g., from the local domain name server 270) for records in the top-level domain zone of the DNS, including returning one or more authoritative name servers (e.g., the registrar name server 250) for registrars associated with each of a plurality of domain names in the top-level domain. The program instructions included in the top-level domain name server program module 240 of the top-level domain name server 230 may be executed by one or more hardware processors.

Still referring to FIG. 2, in embodiments, the registrar name server 250 may be a computer server 12 as shown in FIG. 1. The registrar name server 250 may be implemented as hardware and/or software using components such as mainframes; RISC (Reduced Instruction Set Computer) architecture based servers; servers; blade servers; storage devices; networks and networking components; virtual servers; virtual storage; virtual networks, including virtual private networks; virtual applications and operating systems; and virtual clients.

In embodiments, the registrar name server 250 may be an authoritative name server for a registrar associated with a plurality of domain names in the DNS and may include a registrar name server program module 260, which may include hardware and/or software and may be one or more of the program modules 42 shown in FIG. 1. According to an embodiment, the registrar name server program module 260 includes program instructions for performing functions associated with answering DNS resolution requests (e.g., from the local domain name server 270) for records associated with a particular domain name in the DNS, including returning an IP address associated with a domain name in the DNS request. The program instructions included in the registrar name server program module 260 may also include instructions configured to, for each domain name record stored in the registrar name server 250, populate a TXT field in the DNS record with information about similar hostnames from the similar hostname database 265. The program instructions included in the registrar name server program module 260 of the registrar name server 250 may be executed by one or more hardware processors.

Still referring to FIG. 2, in embodiments, the similar hostname database 265 may be a computer server 12 as shown in FIG. 1. The similar hostname database 265 may be implemented as hardware and/or software using components such as mainframes; RISC (Reduced Instruction Set Computer) architecture based servers; servers; blade servers; storage devices; networks and networking components; virtual servers; virtual storage; virtual networks, including virtual private networks; virtual applications and operating systems; and virtual clients.

In embodiments, the similar hostname database 265 may be a decentralized database such as a DNS distributed database that stores, in TXT entries, information about one or more hostnames that are similar to each hostname in a DNS registry (e.g., the registrar name server 250). For each hostname in a DNS registry, the similar hostname database 265 may store, in a TXT entry, a list of similar hostnames as well as a similarity score that represents a degree of similarity between each similar hostname and the hostname in the DNS registry.

Still referring to FIG. 2, in embodiments, the local domain name server 270 may be a computer server 12 as shown in FIG. 1. The local domain name server 270 may be implemented as hardware and/or software using components such as mainframes; RISC (Reduced Instruction Set Computer) architecture based servers; servers; blade servers; storage devices; networks and networking components; virtual servers; virtual storage; virtual networks, including virtual private networks; virtual applications and operating systems; and virtual clients.

In embodiments, the local domain name server 270 may be a recursive DNS server associated with an Internet service provider used by the client computing device 290 and may include a local domain name server program module 280 and a phishing prevention engine program module 285, each of which may include hardware and/or software and may be one or more of the program modules 42 shown in FIG. 1. According to an embodiment, the local domain name server program module 280 includes program instructions for performing functions associated with answering DNS resolution requests (e.g., from the client computing device 290) for records associated with a particular domain name in the DNS, including returning an IP address associated with a domain name in the DNS request. The phishing prevention engine program module 285 includes program instructions for obtaining a list of similar domain names, filtering the list of similar domain names according to predetermined constraints, and providing a response to a DNS resolution request from the client computing device 290 based on the filtered list of similar domain names. The program instructions included in the local domain name server program module 280 and the phishing prevention engine program module 285 of the local domain name server 270 may be executed by one or more hardware processors.

Still referring to FIG. 2, in embodiments, the client computing device 290 may be a computer system 12 as shown in FIG. 1. The client computing device 290 may be a desktop computer, a laptop computer, a mobile device such as a cellular phone, a tablet, or a PDA, or any other type of computing device. In embodiments, the client computing device 290 may include a web browser program module 295, which may include hardware and/or software and may be one or more of the program modules 42 shown in FIG. 1. According to an embodiment, the web browser program module 295 includes program instructions for a web browser. The program instructions included in the web browser program module 295 of the client computing device 290 may be executed by one or more hardware processors.

Figure 3:
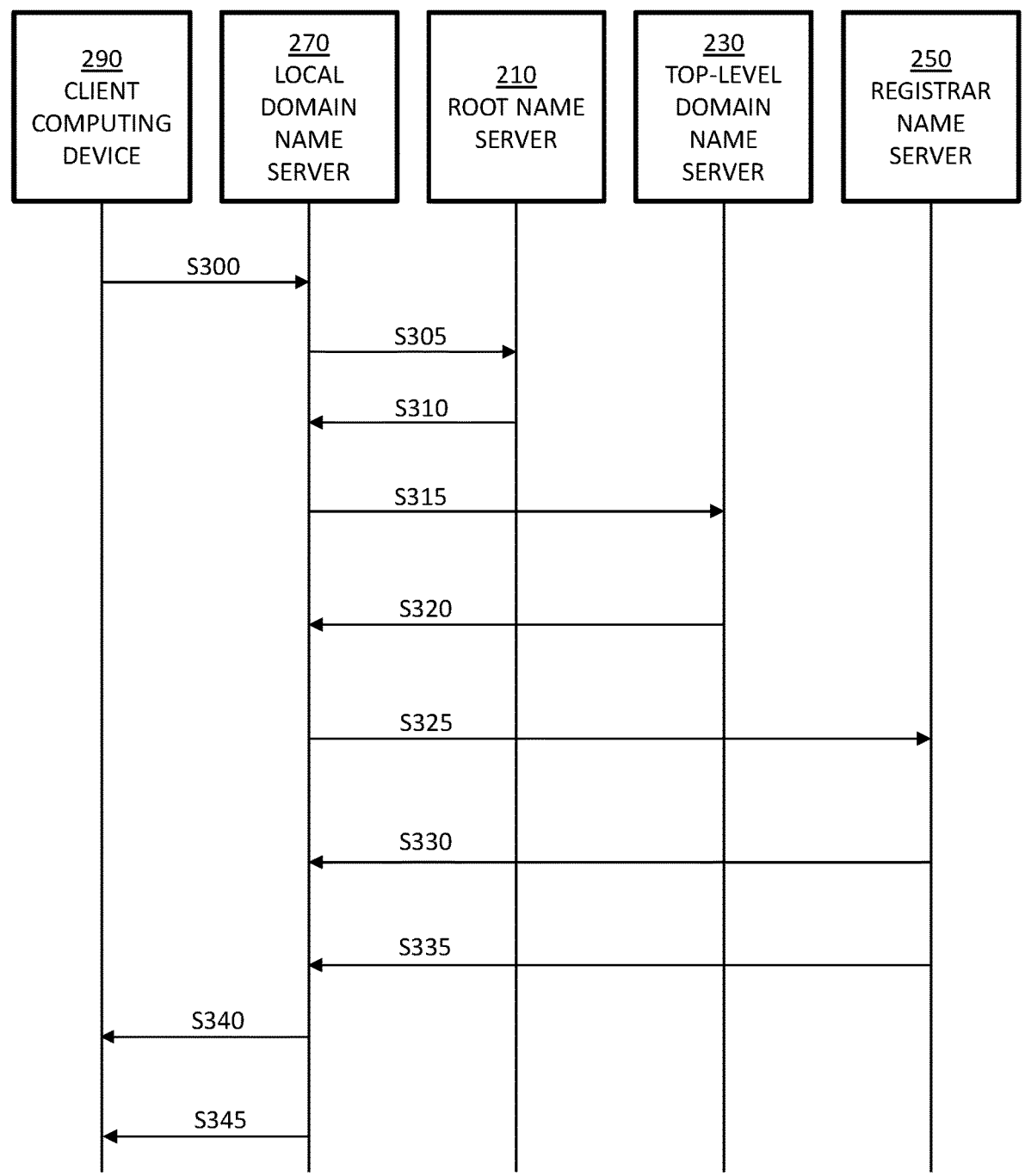
FIG. 3 depicts a flow diagram of an exemplary method in accordance with aspects of the invention.

FIG. 3 depicts a flow diagram of an exemplary method in accordance with aspects of the invention. The steps of the method may be performed in the environment of FIG. 2 and are described with reference to the elements and steps described with respect to FIGS. 1 and 2.

At step S300, the client computing device 290 requests a DNS resolution for a domain name. The request may be initiated by the web browser program module 295 or any other program module running on the client computing device 290. The request is sent to the local domain name server 270, which may be a recursive DNS server. The local domain name server program module 280 on the local domain name server 270 may receive the request sent from the client computing device 290. A request ID may be associated with the request and tracked by the local domain name server program module 280.

At step S305, the local domain name server program module 280 sends a request for DNS resolution to the root name server 210. In particular, the local domain name server program module 280 sends the domain name received at step S300, or the top-level domain portion of the domain name, to the root name server 210. The request sent at step S305 may ask for the identification of the authoritative name server associated with the top level domain in the domain name associated with the request at step S300. The request may be received by the root name server program module 220.

At step S310, the root name server program module 220 replies to the request received at step S305 by sending the identification of the top-level domain name server 230, which is the authoritative name server associated with the top level domain in the domain name associated with the request at step S300, to the local domain name server 270.

At step S315, the local domain name server program module 280 sends a request for DNS resolution to the top-level domain name server 230 identified in step S310. In particular, the local domain name server program module 280 sends the domain name received at step S300 to the top-level domain name server 230. The request may be received by the top-level domain name server program module 240. The request sent at step S315 may ask for the identification of the authoritative name server associated with the domain name associated with the request at step S300.

At step S320, the top-level domain name server program module 240 replies to the request received at step S315 by sending the identification of the registrar name server 250, which is the authoritative name server associated with the domain name associated with the request at step S300, to the local domain name server 270.

At step S325, the local domain name server program module 280 sends a request for DNS resolution to the registrar name server 250 identified in step S320. In particular, the local domain name server program module 280 sends the domain name associated with the request at step S300 to the registrar name server 250. The request may be received by the registrar name server program module 260. The request sent at step S325 may ask for the IP address of the server associated with the domain name associated with the request at step S300.

At step S330, the registrar name server program module 260, in response to receiving the request at step S325, replies to the request by sending the IP address of the server associated with the domain name from the request sent at step S300, as stored in the DNS record for the domain name, to the local domain name server 270. The response is received by the local domain name server program module 280.

At step S335, the registrar name server program module 260, also in response to receiving the request at step S325, replies to the request by sending the contents of the TXT field in the DNS record associated with the domain name from the request sent at step S300, to the local domain name server 270. The TXT field contents are received by the phishing prevention engine program module 285. Alternatively, the TXT field contents are received by the local domain name server program module 280 and passed on to the phishing prevention engine program module 285.

Steps S330 and S335 may be performed asynchronously and in any order. That is, the registrar name server program module 260 may send the IP address and the contents of the TXT field asynchronously. According to another embodiment, the registrar name server program module 260 may send the IP address and the contents of the TXT field to the local domain name server 270 together in a single reply message.

The TXT field contents sent at step S335 may include a list of one or more hostnames (e.g., domain names) that are similar to the domain name from the request sent at step S300, as well as a similarity score associated with each hostname in the list. The list may include a comma or semi-colon delimited list of hostnames and similarity scores. Any metric may be used to determine a similarity between a hostname and the domain name from the request sent at step S300 and compute the similarity score. The list may include a predetermined number of hostnames having a highest similarity score. Alternatively, the list may include all hostnames having a similarity score higher than a predetermined threshold.

At step S340, the local domain name server program module 280 sends the IP address of the server associated with the domain name from the request sent at step S300 to the client computing device 290. The IP address may be received by the web browser program module 295 or any other program module running on the client computing device 290 and may be responsive to the DNS resolution requested at step S300 by that program module. Alternatively, the local domain name server program module 280 may send the IP address to the phishing prevention engine program module 285, and the phishing prevention engine program module 285 may send the IP address to the client computing device 290.

At step S345, the phishing prevention engine program module 285 filters the list of similar hostnames received at step S335 using one or more predetermined constraints. For example, the phishing prevention engine program module 285 may filter the list such that only hostnames having a similarity score greater than a predetermined threshold (e.g., 0.9) are retained, and other hostnames may be discarded. Alternatively, the phishing prevention engine program module 285 may filter the list based on any other criteria or using any other constraints (e.g., a predetermined number of hostnames having the highest scores). The phishing prevention engine program module 285 then sends the filtered list of similar hostnames to the client computing device 290.

Also at step S345, the list of similar hostnames may be received by the web browser program module 295 or any other program module running on the client computing device 290. In response, the client computing device 290 (e.g., the web browser program module 295) may alert a user of the other similar hostnames in the filtered list, which may be well-known domain names. Alternatively, the client computing device 290 (e.g., the web browser program module 295) may prevent a web page associated with a specified domain name from being loaded, based upon receiving the list of similar hostnames. For example, the client computing device 290 may determine that a hostname in the list of similar hostnames is a more frequently visited website and therefore determine that the specified domain name is likely to be a fraudulent website that should not be loaded. The client computing device 290 may also choose to take any other actions upon receiving the list of similar hostnames.

In embodiments, a service provider could offer to perform the processes described herein. In this case, the service provider can create, maintain, deploy, support, etc., the computer infrastructure that performs the process steps of the invention for one or more customers. These customers may be, for example, any business that uses cloud computing technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:

receiving, by a local domain name server, a domain name system (DNS) request comprising a domain name from a web browser of a remote user computing device;

determining, by a phishing prevention engine program module of the local domain name server, at least one preexisting domain name that is similar to the domain name in the DNS request;

determining, by the local domain name server, an Internet Protocol (IP) address associated with the domain name in the DNS request;

sending, by the local domain name server, the IP address to the web browser of the remote user computing device in response to the DNS request; and sending, by the phishing prevention engine program module of the local domain name server, the at least one preexisting domain name that is similar to the domain name in the DNS request to the web browser of the remote user computing device in response to the DNS request.

2. The method according to claim 1, wherein the at least one preexisting domain name that is similar to the domain name in the DNS request, and the IP address, are sent asynchronously to the web browser of the remote user computing device.

3. The method according to claim 1, wherein the at least one preexisting domain name that is similar to the domain name in the DNS request is stored as a TXT record associated with the domain name.

4. The method according to claim 1, wherein the sending the at least one preexisting domain name that is similar to the domain name in the DNS request further comprises sending a similarity score for each of the at least one preexisting domain name.

5. The method according to claim 4, wherein the similarity score of each of the at least one preexisting domain name is above a predetermined threshold.

6. A computer program product comprising a computer readable storage medium having program instructions embodied therewith, the program instructions executable by a recursive local domain name server to cause the recursive local domain name server to:

receive a domain name system (DNS) resolution request from a web browser of a remote user computing device comprising the first domain name;

send a request for DNS resolution including the first domain name to a registrar name server;

receive a TXT field in a DNS record associated with the first domain name in response to the request for DNS resolution, the TXT field comprising a list of one or more preexisting domain names similar to the first domain name and similarity scores associated with respective ones of the one or more preexisting domain names similar to the first domain name;

generate, by a phishing prevention engine program module of the recursive local domain name server, a filtered list of the preexisting domain names similar to the first domain name by filtering the list of one or more preexisting domain names similar to the first domain name based on the similarity scores; and send the filtered list of preexisting domain names similar to the first domain name to the web browser of the remote user computing device as a response to the DNS resolution request, wherein the filtered list of preexisting domain names similar to the first domain name indicate to the remote user computing device that the first domain name is likely a fraudulent website that should not be loaded by the remote user computer device.

7. The computer program product according to claim 6, the program instructions further executable by the computing device to cause the recursive local domain name server to:

determine an Internet Protocol (IP) address associated with the first domain name; and send the IP address as another response to the DNS resolution request.

8. The computer program product according to claim 7, wherein the IP address and the filtered list of preexisting domain names similar to the first domain name are sent asynchronously.

9. The computer program product according to claim 6, wherein the program instructions further cause the recursive local domain name server to store the TXT field in the DNS record for the first domain name.

10. The computer program product according to claim 6, wherein the sending the filtered list of the preexisting domain names similar to the domain name further comprises sending a similarity score for each of the preexisting domain names in the filtered list of the preexisting domain names similar to the domain name.

11. The computer program product according to claim 10, wherein the similarity score of each of the preexisting domain names in the filtered list of the preexisting domain names similar to the domain name is above a predetermined threshold.

12. A system comprising:
 a hardware processor, a computer readable memory, and a computer readable storage medium associated with a computing device;
 program instructions to send a domain name system (DNS) request for records associated with a domain name to a local domain name server;
 program instructions to receive and store at least one preexisting domain name that is similar to the domain name as a response to the DNS request;
 program instructions to determine that the domain name is associated with a fraudulent website using the received at least one preexisting domain name that is similar to the domain name,
 wherein the program instructions are stored on the computer readable storage medium for execution by the hardware processor via the computer readable memory.

13. The system according to claim 12, further comprising program instructions configured to receive an Internet Protocol (IP) address associated with the domain name as another response to the DNS request.

14. The system according to claim 13, wherein the at least one preexisting domain name that is similar to the domain name and the IP address are received asynchronously.

15. The system according to claim 12, wherein the receiving the at least one preexisting domain name that is similar to the domain name further comprises receiving a similarity score for each of the at least one preexisting domain name.

16. The system according to claim 15, further comprising program instructions configured to filter the at least one preexisting domain name that is similar to the domain name.

17. The system according to claim 16, wherein, in response to determining that the domain name is associated with the fraudulent website, loading of the fraudulent website is prevented.

18. The method of claim 1, further comprising:
 sending, by the local domain name server, a request for DNS resolution to a remote top-level domain name server;
 receiving, by the local domain name server, a reply from the remote top-level domain name server including identification of a remote registrar name server as an authoritative name server associated with the domain name from the DNS request;
 sending, by the local domain name server, a request for DNS resolution to the remote registrar name server; and
 receiving, by the local domain name server, a reply from the remote registrar name server including the IP address of the server associated with the domain name from the DNS request;
 wherein the determining the IP address associated with the domain name in the DNS request is based on the reply from the remote registrar name server; and
 wherein the sending the IP address in response to the DNS request and the sending the at least one preexisting domain name that is similar to the domain name in the DNS request occur together in a single reply message to the web browser of the remote user computing device.

19. The computer program product of claim 6, wherein the program instructions further cause the recursive local domain name server to:
 send a request for DNS resolution to a remote top-level domain name server;
 receive a reply from the remote top-level domain name server including identification of a remote registrar name server as an authoritative name server associated with the domain name from the DNS resolution request;
 send a request for DNS resolution to the remote registrar name server; and
 receive a reply from the remote registrar name server including an IP address of the server associated with the domain name from the DNS resolution request; and
 send the IP address as another response to the DNS resolution request.

20. A system of claim 12, further comprising program instructions to initiate the DNS request via a web browser program module of the computing device.

* * * * *